United States Patent
Kim et al.

[11] Patent Number: 5,566,495
[45] Date of Patent: Oct. 22, 1996

[54] FISHING ROD HOLDING AND SUPPORTING DEVICE

[76] Inventors: Sun K. Kim, 14208 Wood Whell Ter., Silver Spring, Md. 20906; Pok K. Kim, 15014 Athey Rd., Burtonsville, Md. 20866

[21] Appl. No.: 515,944

[22] Filed: Aug. 16, 1995

[51] Int. Cl.⁶ .................................................. A01K 97/10
[52] U.S. Cl. ............................................ 43/21.2; 248/538
[58] Field of Search ........................... 43/21.2; 248/530, 248/534, 535, 538, 514

[56] References Cited

U.S. PATENT DOCUMENTS

| | | | |
|---|---|---|---|
| 2,199,034 | 4/1940 | Witczak | 248/514 |
| 2,603,900 | 7/1952 | Kellett | 248/530 |
| 2,652,999 | 9/1953 | Lohmar | 248/530 |
| 3,645,028 | 2/1972 | Rayburn | 43/21.2 |
| 4,425,729 | 1/1984 | Miyamae . | |
| 4,486,968 | 12/1984 | Gould . | |
| 4,637,156 | 1/1987 | Simmons | 43/21.2 |
| 4,676,019 | 6/1987 | Engles | 43/21.2 |
| 5,115,598 | 5/1992 | Shaw | 43/21.2 |
| 5,210,971 | 5/1993 | Efantis | 43/21.2 |
| 5,349,775 | 9/1994 | Mondares . | |
| 5,359,802 | 11/1994 | Gutierrez . | |

FOREIGN PATENT DOCUMENTS

| | | | |
|---|---|---|---|
| 1062812 | 4/1954 | France | 43/21.2 |
| 2621977 | 4/1989 | France . | |

*Primary Examiner*—Joseph J. Hail, III
*Assistant Examiner*—James Miner
*Attorney, Agent, or Firm*—Birch, Stewart, Kolasch & Birch, LLP

[57] ABSTRACT

An improved fishing rod holding and supporting device including a V-shaped stand member having a pointed tip, a hinge, and a T-shaped anchor, and a tubular receiver having an opening for slidably receiving a fishing rod. The device can be tightly fixed to the ground by the pointed tip or optionally to the deck by the T-shaped anchor.

5 Claims, 1 Drawing Sheet

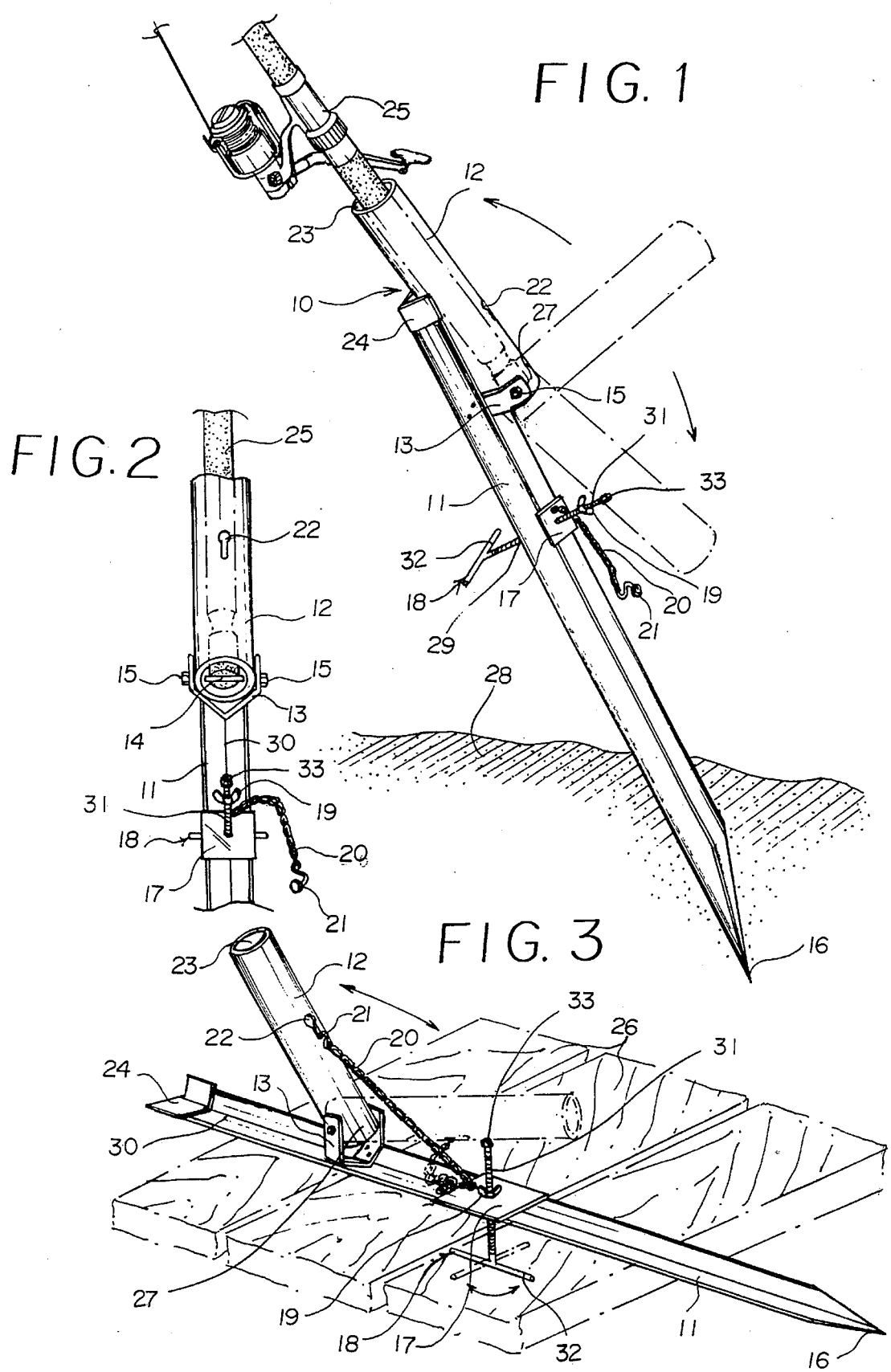

FISHING ROD HOLDING AND SUPPORTING DEVICE

BACKGROUND OF THE INVENTION

1. Field of the Invention

The present invention relates to an improved fishing rod holding and supporting device and more particularly, a fishing rod holding and supporting device including a tubular receiver pivotally connected to a V-shaped stand member whereby the fishing rod holding and supporting device with the tubular receiver which contains a fishing rod can rotate to retract a fish. Advantageously, the V-shaped stand member can be driven into the ground or sand or mounted on the deck of a boat.

2. Description of Related Art

Various types of fishing rod holders are known in the art. Generally, most commercial fishing rod holders include a pointed tip and a V-shaped head extending from the pointed tip. Recently, most conventional fishing rod holders include a tubular receiver for receiving the fishing rod and a stake pivotally connected to the tubular receiver and a spring connected to both the tubular receiver and the stake for automatically lifting the fishing rod. Also, the conventional stake is provided with a screwed bolt and nut for attaching the stake to the wood pole, the deck, and the like. Such conventional fishing rod holders are shown in U.S. Pat. No. 4,425,729 to Miyamae, U.S. Pat. No. 4,486,968 to Gould, U.S. Pat. No. 5,349,775 to Mondares, and U.S. Pat. No. 5,359,802 to Gutierrez.

However, such conventional fishing rod holders suffer from a number of problems such as, for example, they is complicated in structure, expensive to manufacture, and difficult to use. Furthermore, they do not have double functions whereby the fishing rod holders are supported both on the ground and on the floor or deck of a boat. Also, they are inconvenient to transport or hand carry.

SUMMARY OF THE INVENTION

Accordingly, it is an object of the present invention to provide an improved fishing rod holding and supporting device, which eliminates the above problems encountered with the conventional fishing rod holders.

Another object of the present invention is to provide a fishing rod holding and supporting device including a tubular receiver for slidably receiving a fishing rod, said tubular receiver being pivotally connected to a V-shaped stand member by a pivot pin. The V-shaped stand member has a pointed tip for tightly inserting it into the ground surface, and also contains a T-shaped anchor having a chain with a lock hook disposed on one end thereof for locking with a locking aperture provided at the middle portion of the tubular receiver. Accordingly, the fishing rod holding and supporting device is supported by the chain and can be easily lifted by a user to retract a fish.

A further object of the present invention is to provide a fishing rod holding and supporting device which is simple in structure, inexpensive to manufacture, durable in use, refined in appearance, and readily portable.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an improved fishing rod holding and supporting device which includes a V-shaped stand member having a pointed tip, a hinge, and a T-shaped anchor, and a tubular receiver having an opening for slidably receiving a fishing rod and a pivot pin for pivotally connecting the tubular receiver to the stand member. The device can be tightly fixed to the ground by the pointed tip or to the deck by the T-shaped anchor, and as such, can be used to easily lift the tubular receiver containing the fishing rod.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view of a fishing rod holding and supporting device according to the present invention showing the device supported by the ground surface;

FIG. 2 is a front elevational view of an essential portion of the fishing rod holding and supporting device according to the present invention; and FIG. 3 is a perspective view of the fishing rod holding and supporting device according to the present invention showing the device supported on a wooden deck.

DETAILED DESCRIPTION OF THE PREFERRED EMBODIMENTS

Referring now in detail to the drawings for the purpose of illustrating preferred embodiments of the present invention, the fishing rod holding and supporting device as shown in FIGS. 2 and 3 comprises a V-shaped stand member 11 and a tubular receiver 12 pivotally attached to a U-shaped hinge 13 which is secured to the stand member 11 through a pivot pin 14 and bolts 15 of the tubular receiver.

The tubular receiver 12 includes an opening 23 at the top end thereof for slidably receiving and supporting a fishing rod 25 and a bottom end 27 which is pivotally mounting to hinge 13 disposed on the upper portion of the stand member 11. The tubular receiver 12 further includes a locking aperture 22 disposed in the middle portion thereof. The locking aperture 22 can have a T-shaped configuration for receiving the locking hook 21.

The V-shaped stand member 11 includes a V-shaped rubber support 24 adhered to the top end thereof for supporting the tubular receiver 12 when the fishing pole is in its extended position. A pointed tip 16 is provided at the bottom end thereof for inserting the stand member 11 into the ground surface 28 (FIG. 1), and a center aperture 29 is disposed at the center portion and in the valley 30 thereof for slidably receiving a T-shaped anchor 17.

As shown in FIG. 3, the T-shaped anchor 18 has a screwed leg 31, a cross head stopper 32, and a stopper 33. The T-shaped anchor 18 is provided with a plate washer 17 and a wing nut 19 for tightly attaching the V-shaped stand member 11 to a wood constructed floor such as a boat deck. At this time, the V-shaped stand member 11 is downwardly positioned between a pair of pieces of wood boards 26 and the cross head stopper 32 is adjusted in a cross state with the V-shaped stand member 11. Thereafter, the wing nut is screwed and the locking hook 21 is locked within the locking aperture 22. A chain 20 is connected to the locking hook 22 and the plate washer 17 (FIG. 3).

Accordingly, the tubular receiver 12 can be pivotally moved on the V-shaped stand member 11 for effectively holding and supporting the fishing rod 25. Also, the tubular receiver 12 holding the fishing rod 25 can be easily lifted in response to any pulling motion.

The fishing rod holding and supporting device 10 of the present invention is preferably comprised of a lightweight material which allows the supporting device to be easily carried by the user. In a preferred embodiment, the tubular receiver 12 and the V-shaped stand member 11 are made of hard plastic materials, aluminum components and composites, or other metal alloys.

The fishing rod holder 10 according to the present invention operates as follows. As shown in FIG. 1, the V-shaped stand member 11 may be upwardly inserted into the ground surface 28 by applying the force of the hands or the like, thereby forcing the pointed tip 16 to pierce the ground surface 28 and enter the sand. Afterwards, the fishing rod is put into the opening 23 of the tubular receiver 12. When a fish takes the bait, the user can easily lift the tubular receiver 12 containing the fishing rod 25.

As shown in FIG. 3, the V-shaped stand member may be downwardly located in a space between pieces of wood boards 26, and the cross stopper 32 of the anchor 18 may be disposed on the bottom surface of the wood boards 26 of the deck, and is located in the cross direction about the stand member 11. Thereafter, the locking hook 21 of the chain 20 is locked in the locking aperture 22 of the tubular receiver 12. Afterwards, the wing nut 19 is screwed to tightly attach the stand member 11 to the wood boards 26 of the deck through the plate washer 17. When a fish takes the bait on the fishing hook, the user can easily lift the tubular receiver 12 containing the fishing rod.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fishing rod holding and supporting device comprising:
   a tubular receiver for slidably receiving and supporting a fishing rod, said tubular receiver including:
      an opening disposed in an upper end thereof for slidably receiving the fishing rod,
      a pivot pin attached to a bottomward end thereof said pivot pin horizontally disposed in a cross position of the tubular receiver, and
      a locking aperture disposed on a middle portion thereof,
   a V-shaped stand member for supporting the fishing rod on the ground surface and a wood floor deck, said V-shaped stand member including:
      a U-shaped hinge disposed on an upper position thereof for pivotally receiving the pivot pin of the tubular receiver so as to pivotally lift the tubular receiver containing the fishing rod when a fish is eating bait on the fishing hook,
      a V-shaped rubber support adhered to a topward end thereof for comfortably supporting the tubular receiver,
      a pointed tip disposed at the most bottomward end thereof for inserting the stand member into the ground surface, a center aperture disposed on a center portion and disposed in a valley thereof and slidably receiving a T-shaped anchor so as to tightly attach the V-shaped stand member in a downward position to the wood floor deck.

2. The fishing rod holding and supporting device of claim 1, wherein said T-shaped anchor includes:
   a screwed leg,
   a cross head stopper,
   a stopper disposed on an end of said screwed leg,
   a plate washer movably put into said screwed leg,
   a wing nut movably screwed around said screwed leg and disposed between said cross head stopper and said plate washer, and
   a chain attached to said plate washer at one end and at the other end thereof, a locking hook for tightly engaging and locking with said locking aperture of the tubular receiver, whereby after the V-shaped stand member is put into a space between wood board pieces of the deck and the cross head stopper is in a cross position about the wood board pieces, the wing nut is screwed and the locking hook locks with the locking aperture.

3. The fishing rod holding and supporting device of claim 1, wherein said locking aperture has a T-shaped configuration for tightly engaging and locking the locking hook.

4. The fishing rod holding and supporting device of claim 1, wherein said tubular receiver is made of a light-weight material selected from the group consisting of a plastic and aluminum.

5. The fishing rod holding and supporting device of claim 1, wherein said T-shaped stand member is made of a light-weight material selected from the group consisting of a plastic, aluminum, and aluminum alloys.

* * * * *